Feb. 3, 1931. W. W. HICKS 1,791,095
ELECTRICAL WATER HEATER
Filed Nov. 2, 1929 2 Sheets-Sheet 1
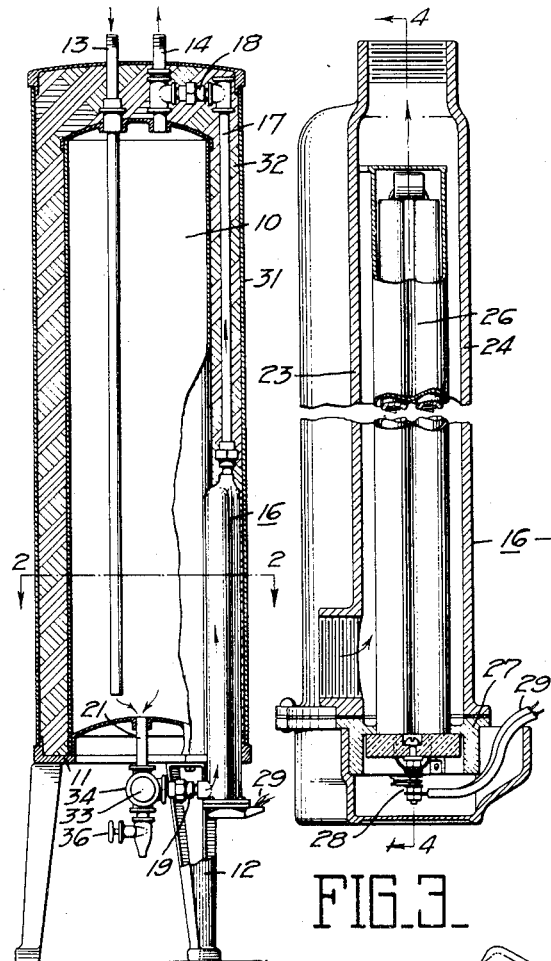
FIG.1
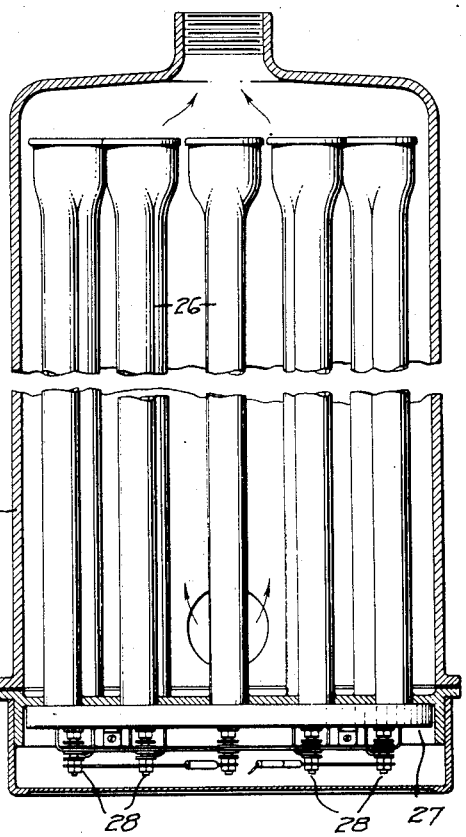
FIG.3
FIG.4
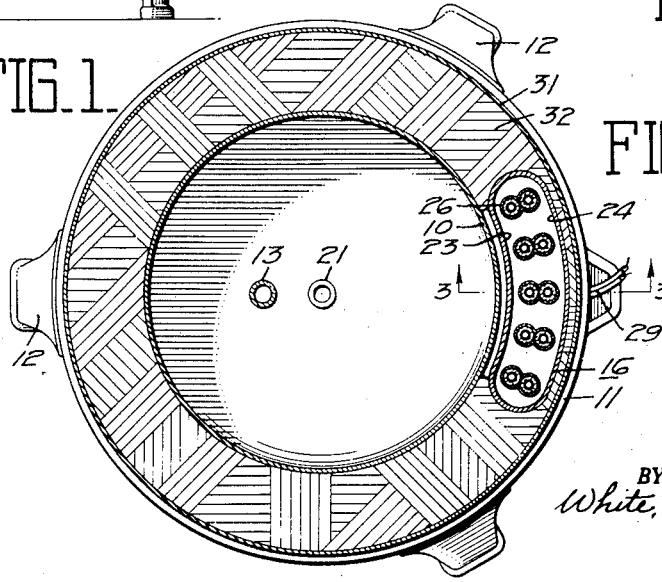
FIG.2
INVENTOR.
William Wesley Hicks
BY
White, Prost, Flehr & Lothrop
ATTORNEYS.

Feb. 3, 1931.                W. W. HICKS                1,791,095
                        ELECTRICAL WATER HEATER
                        Filed Nov. 2, 1929          2 Sheets-Sheet 2
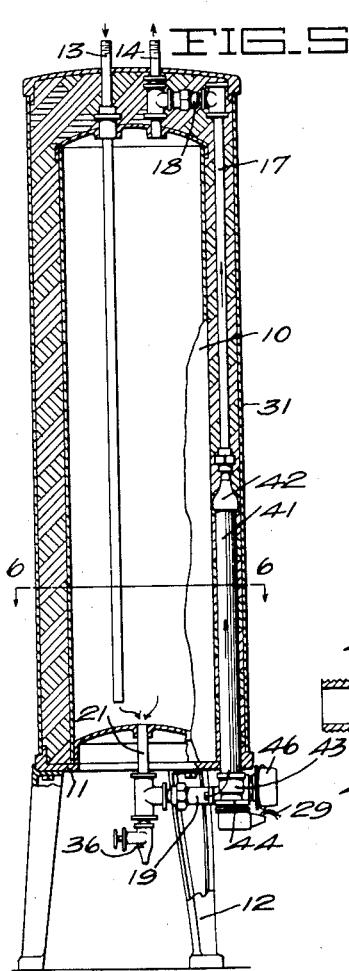
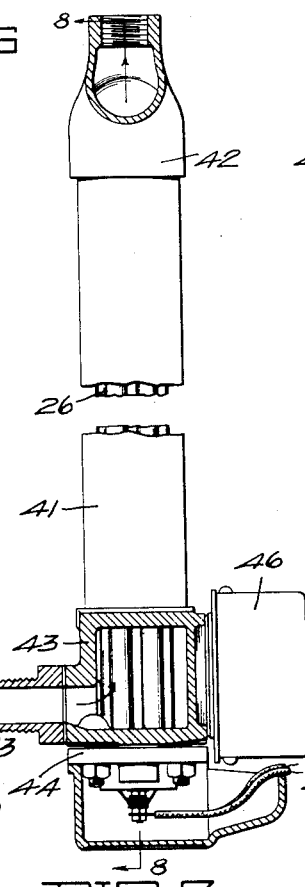
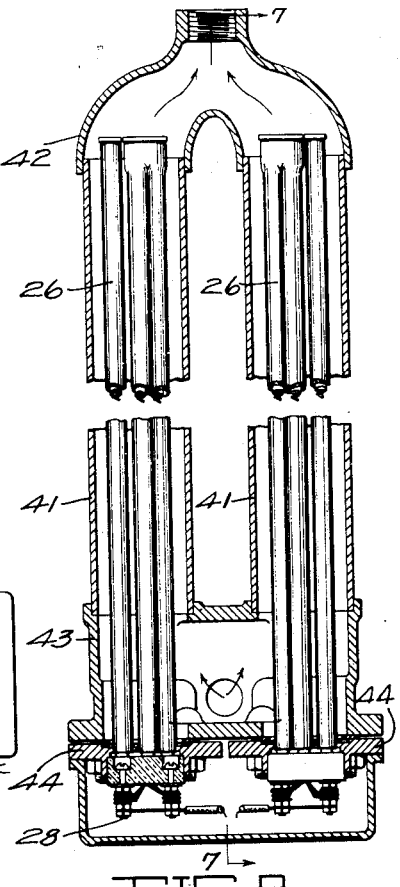
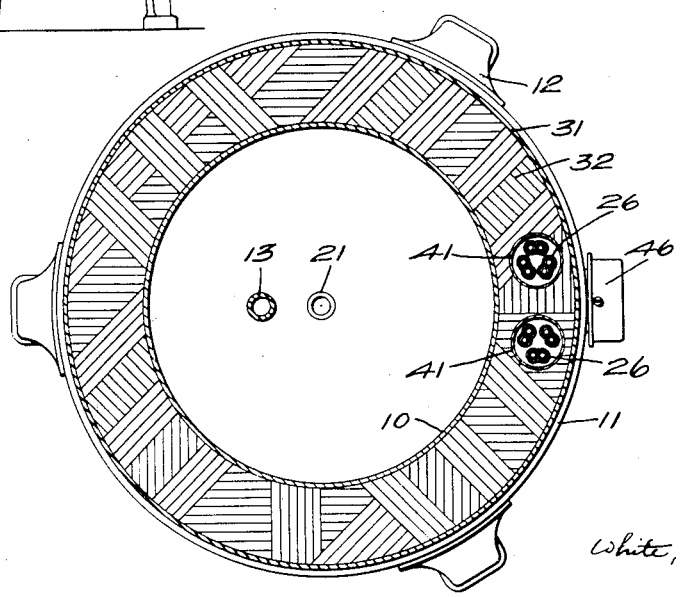
INVENTOR
William Wesley Hicks
BY
White, Prost, Flehr & Lothrop
ATTORNEYS Patented Feb. 3, 1931

1,791,095

UNITED STATES PATENT OFFICE

WILLIAM WESLEY HICKS, OF SAN FRANCISCO, CALIFORNIA

ELECTRICAL WATER HEATER

Application filed November 2, 1929. Serial No. 404,289.

This invention relates generally to electrical heaters for use in conjunction with hot water supply systems. Such devices are commonly used in conjunction with domestic hot water pipes for supplying hot water to faucets, or other points of consumption.

In the construction of electrical water supply heaters, it has been common to utilize a water storage tank having its lower portion connected with a supply of cold water under pressure, and its upper portion connected to the pipe or pipes to which hot water is to be supplied. In order to bring the water into good heat transferring relationship with the electrical heating elements, it has also been proposed to dispose the heating elements externally of the tank. It has also been proposed to remove water from the lower portion of the tank, to pass the same into contact or heat transferring relationship with the heating elements, and to return the hot water into the upper portion of the tank. While the operation of such heaters has been comparatively satisfactory, they have been subject to certain objections, namely that the external parts associated with the heating elements rendered the complete device too bulky for many installations. Furthermore the external parts to which liquid circulated, were frequently not insulated properly, thus causing a loss of heat with resulting higher operating cost.

It is an object of the present invention to devise an electrical water supply heater of the character described above, which will be relatively compact when assembled, which can be installed in a relatively small space, and will afford a neat appearance.

It is a further object of this invention to devise an electrical hot water supply heater having means external of a water storage tank for circulating the water to be heated, but which will be inexpensively and adequately heat insulated so as to afford a high operating efficiency.

Further objects of the invention will appear from the following description in which I have set forth the preferred embodiment of my invention. It will be understood that the appended claims are to be accorded a range of equivalents consistent with the state of the prior art.

Referring to the drawing:

Figure 1 is a side elevational view partly in cross section, illustrating a hot water supply heater incorporating my invention.

Fig. 2 is a cross sectional detail, taken along the line 2—2 of Fig. 1.

Fig. 3 is a cross sectional detail, taken along the line 3—3 of Fig. 2.

Fig. 4 is a cross sectional view taken along the line 4—4 of Fig. 3.

Fig. 5 is a side elevational view in cross section, illustrating a modified form of device incorporating my invention.

Fig. 6 is a cross sectional view taken along the line 6—6 of Fig. 5.

Fig. 7 is a detail illustrating the construction of the casing means for enclosing the electrical heating elements, such as is incorporated in the device of Fig. 5, this view being taken along the line 7—7 of Fig. 8.

Fig. 8 is a cross sectional view taken along the line 8—8 of Fig. 7.

In the drawing the electrical heater of this invention has been shown as incorporating a water storage tank 10, which is preferably cylindrical in cross section, and is normally positioned upright as shown in Fig. 1. The lower portion of this tank is shown carried by a suitable annular member 11, which in turn is carried by supporting legs 12. Pipe 13 communicates with tank 10, preferably at a point adjacent the lower portion of the same, and is connected to a source of cold water under pressure. Pipe 14 is connected to the upper portion of tank 10, and serves to supply hot water to faucets, or like devices. For circulating water from the tank thru external conduit means, I have shown a metallic casing 16, which is preferably positioned in close proximity to one side of the tank 10. The upper portion of casing 16 is shown connected to the upper portion of tank 10, by vertical pipe 17, and lateral pipe 18. The lower portion of casing 16 is connected to the lower portion of tank 10, thru pipes 19 and 21.

One desirable form for casing 16, is shown in Figs. 2, 3 and 4. Thus as shown in Fig. 2, this casing has an inner wall 23, which is curved similarly to the curvature of side walls of tank 10, so as to enable the casing to be disposed relatively closely to the tank. The outer wall 24 of the casing is likewise preferably curved in a manner similar to wall 23, but convexly. While the form for casing 16 may vary, a transverse cross section, such as shown in Fig. 2, preferably has a major dimension in a direction circumferentially of tank 10, and a minor dimension measured radially from the center of tank 10.

The electrical heating elements are preferably positioned within casing 16, these elements being indicated generally at 26. For convenience I have illustrated elements constructed as disclosed and claimed in Kercher and Hicks Patent 1,671,592, granted May 29, 1929. These elements are carried by a header 27, which in turn is removably clamped to the lower end of casing 16. Header 27 also carries terminal contacts 28, which can be connected to current supply conduits 29. Header 27 is also preferably curved so as to be similar in outline to the cross sectional outline of casing 16.

Instead of permitting casing 16 to be exposed, I preferably enclose this casing and also tank 10, within a single outer housing or shell 31. This housing is preferably of uninterrupted cylindrical form throughout its entire length. This is made possible, without resorting to a housing of too large a diameter, by the dimensions of casing 16. In order to minimize dissipation of heat to the outer housing 31, which is generally of metal, the space between this housing and tank 10 is filled with some suitable insulating material 32. As shown in Fig. 2, a certain amount of this material is also disposed between the outer wall 24 of casing 16, and the adjacent wall of cylindrical housing 31. The lower end of housing 31, can also be carried by annular member 11.

Generally an electrical heater of the type described above is used in conjunction with a thermostat control switch, so that supply of current to the electrical heating element is interrupted when a predetermined amount of water has been properly heated, or when the tank has become filled with hot water. In the particular embodiment shown, a thermostat control switch has been indicated generally at 33, and is mounted in conjunction with a pipe fitting 34. Fitting 34 is interposed between pipes 19 and 21. A suitable drainage valve 36 can also be connected to fitting 34.

It will be apparent that the heater described above will be relatively compact, and can be installed in a small space. In fact the outer housing 31 is not substantially larger in diameter, than water heaters employing heating elements disposed within the storage tank. Furthermore there is substantially no loss of heat from casing 16 and pipes 17 and 18, since these parts are adequately heat insulated by the same heat insulating material which serves to insulate the tank 10. In spite of the fact that casing 16 is entirely enclosed and hidden within the cylindrical housing 31, the heating elements are readily accessible for repair or replacement, merely by detaching the header 27, and removing this header together with the heating elements from casing 16.

A modification of my invention is shown in Figs. 5 to 8 inclusive. In this case in place of utilizing a casing 16 which is oval in cross section as shown in Fig. 2, I utilize casing means formed by a plurality of metal tubes or pipes 41, which are connected at their upper and lower ends by headers 42 and 43. Heating elements 26 are disposed within each tube 41, and are carried by the members 44, these members being removably clamped to header 43. The upper header 42, which of course communicates with both tubes 41, connects with pipe 17, while the lower header 43 connects with pipe 19. Thermostat switch 46 can be mounted directly upon header 43. As shown in Figs. 5 and 6, tubes 41 are disposed entirely within the housing 31, and are heat insulated by the same insulating material utilized for heat insulating the tank 10.

I claim:

1. In an electrical hot water supply heater, a storage tank, a housing of substantially uninterrupted cylindrical shape disposed about said storage tank, thereby forming an annular cylindrical chamber between the tank and the housing, a fluid conduit communicating between the upper and lower portions of said storage tank and extending within the annular chamber, said conduit including an elongated portion having a cross section substantially greater than the cross section of the remainder of the conduit, said enlarged portion extending longitudinally within said chamber and having an opening adjacent the base of the chamber, an electrical heating element extending upwardly through said opening and within said enlarged portion, whereby the heating element is disposed substantially entirely within the annular chamber, and heat insulating material disposed between said tank and said housing serving to heat insulate both the tank and the conduit.

2. In an electrical hot water supply heater, a storage tank, a housing of substantially uninterrupted cylindrical shape disposed about said storage tank, thereby forming an annular cylindrical chamber between the tank and the housing, a fluid conduit communicating between the upper and lower portions of said storage tank and extending within the annular chamber, said conduit including a plurality of parallel branch tubes each of which is adapted to serve as a casing for an electrical heating element, each of said branch tubes extending longitudinally within said chamber and having an opening adjacent the base of the chamber, and an electrical heating element extending upwardly within each of said branch tubes.

3. In an electrical hot water supply heater, a storage tank, a housing of substantially uninterrupted cylindrical shape disposed about said storage tank, thereby forming an annular cylindrical chamber between the tank and the housing, a fluid conduit communicating between the upper and lower portions of said storage tank and extending within the annular chamber, said conduit including a plurality of parallel branch tubes each of which is adapted to serve as a casing for an electrical heating element, each of said branch tubes extending longitudinally within said chamber and having an opening adjacent the base of the chamber, all of said branch tubes being substantially equally spaced from the said storage tank, a header at each end of said branch tubes serving to connect the tubes together, and an electrical heating element extending upwardly within each of said branch tubes.

In testimony whereof, I have hereunto set my hand.

WILLIAM WESLEY HICKS.